US012680666B2

(12) United States Patent
Vissenberg et al.

(10) Patent No.: US 12,680,666 B2
(45) Date of Patent: Jul. 14, 2026

(54) LUMINAIRE WITH LIGHT EXIT WINDOW

(71) Applicant: SIGNIFY HOLDING B.V., Eindhoven (NL)

(72) Inventors: Michel Cornelis Josephus Marie Vissenberg, Roermond (NL); Malgorzata Perz, Eindhoven (NL); Dragan Sekulovski, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/116,043

(22) PCT Filed: Oct. 9, 2023

(86) PCT No.: PCT/EP2023/077882
§ 371 (c)(1),
(2) Date: Mar. 27, 2025

(87) PCT Pub. No.: WO2024/079041
PCT Pub. Date: Apr. 18, 2024

(65) Prior Publication Data
US 2026/0104152 A1 Apr. 16, 2026

(30) Foreign Application Priority Data
Oct. 13, 2022 (EP) ..................................... 22201350

(51) Int. Cl.
*F21V 3/04* (2018.01)
*F21V 8/00* (2006.01)
(Continued)

(52) U.S. Cl.
CPC ................ *F21V 3/049* (2013.01); *F21V 9/08* (2013.01); *F21V 13/10* (2013.01); *F21Y 2115/10* (2016.08); *G02B 6/0025* (2013.01)

(58) Field of Classification Search
CPC ............................... F21V 3/049; G02B 6/0025
See application file for complete search history.

(56) References Cited

U.S. PATENT DOCUMENTS

| | | | |
|---|---|---|---|
| 2012/0162978 A1* | 6/2012 | Farmer .................. | G02B 5/021 |
| | | | 359/888 |
| 2015/0029205 A1* | 1/2015 | Huang ..................... | G06T 5/90 |
| | | | 345/589 |

(Continued)

FOREIGN PATENT DOCUMENTS

WO 2017019725 A1 2/2017

OTHER PUBLICATIONS

Stuart M. Anstis et al., "A Craik-Obrien-Cornsweet Illusion For Visual Depth", Vision Res., vol. 18, pp. 213 to 217, Peergamon Press 1978. Printed in Great Britain.

(Continued)

*Primary Examiner* — Alexander K Garlen

(57) ABSTRACT

A luminaire (100), comprising at least one light source (110) arranged to emit light source light (120), a light exit window (130), wherein the emitted light is arranged to exit the luminaire through the light exit window as luminaire light (135), wherein the light exit window is configured to influence the luminance, L, of the light source light, for generating a profile of the luminance, LP, of the luminaire light as a function of a length 5 dimension, x, of the light exit window, defined from a center (310) of the light exit window to a periphery (320) of the light exit window.

15 Claims, 6 Drawing Sheets

(51) Int. Cl.
    F21V 9/08           (2018.01)
    F21V 13/10         (2006.01)
    F21Y 115/10      (2016.01)

(56)           References Cited

U.S. PATENT DOCUMENTS

| | | | |
|---|---|---|---|
| 2015/0170347 A1* | 6/2015 | Finlayson | G06T 5/70 |
| | | | 382/279 |
| 2017/0082262 A1* | 3/2017 | Jung | F21V 3/049 |
| 2018/0045385 A1* | 2/2018 | Tyukhova | F21V 7/0083 |
| 2023/0103849 A1* | 4/2023 | Oh | F21V 9/30 |
| | | | 362/618 |

OTHER PUBLICATIONS

Jiro Hamada, "Asymmetric Lightness Cancellation in Craik-O-Brien Patterns of Negative and Postive Contrast", Biol. Cybern. 52, 117-122 (1985).
Ronald L. Growney et al., "The appearance of the Cornsweet Illusion: Measures of perceived contrast and evenness of brightness", Perception & Psychophysics 1986, 39 (2), 81-86.
Dale Purves et al., "An Empirical Explanation of the Cornsweet Effect", The Journal of Neuroscience, Oct. 1, 1999, 19(19):8542-8551.
Fred Kingdom and Bernard Moulden, "Border effects on brightness: A review of findings, models and issues", Spatial Vision, vol. 3, No. 4, pp. 225-262 (1988).

* cited by examiner

LUMINAIRE WITH LIGHT EXIT WINDOW

CROSS-REFERENCE TO PRIOR APPLICATIONS

This application is the U.S. National Phase application under 35 U.S.C. § 371 of International Application No. PCT/EP2023/077882, filed on Oct. 9, 2023, which claims the benefit of European Patent Application No. 22201350.0, filed on Oct. 13, 2022. These applications are hereby incorporated by reference herein.

FIELD OF THE INVENTION

The present invention generally relates to a luminaire. More specifically, the present invention is related to a luminaire with a light exit window for influencing the light output from the luminaire.

BACKGROUND OF THE INVENTION

There are numerous lighting arrangements in the prior art, such as lamps, luminaires, etc., comprising one or more features for influencing the light output from these lighting arrangements. It will be appreciated that lighting comfort is an important quality aspect of any lighting installation or luminaire. In order to avoid discomfort glare, it is desirable that the luminance of a luminaire remains below a given limit or threshold. This may imply that the luminous intensity should be kept relatively low in certain directions, which however may have one or more negative effects such as an added cost in optical beam shaping components, reduced efficiency and/or a requirement of a higher number of luminaires to evenly illuminate the same area. Alternatively, if a reduced luminous intensity is not an option, the light emitting area could be made relatively large. However, this alternative may also be associated with one or more negative consequences such as an added cost in material usage and/or transport of the luminaires.

Hence, it is an object of the present invention to provide a lighting arrangement which is able to reduce discomfort glare from the lighting arrangement without reducing its average luminance during operation.

SUMMARY OF THE INVENTION

It is of interest to overcome at least some of the deficiencies or drawbacks of current lighting arrangements, in order to provide a lighting arrangement with an improved light output with reduced discomfort glare whilst retaining the average luminance during operation.

This and other objects are achieved by providing a luminaire having the features in the independent claim. Preferred embodiments are defined in the dependent claims.

Hence, according to the present invention, there is provided a luminaire comprising at least one light source arranged to emit light source light and a light exit window; wherein the light source light is arranged to exit the luminaire through the light exit window as luminaire light. The light exit window is configured to influence or modify the luminance, L, of the light source light, for generating a profile of the luminance, $L_P$, of the luminaire light as a function of a length dimension, x, of the light exit window, defined from a center of the light exit window to a periphery of the light exit window. The profile of the luminance, $L_P$, comprises, at least, a first interval, $x_1$, of the length dimension, x, comprising a step function, S(x), of the luminance, $L_P$, with a first gradient, $G_1 = dL_P/dx$, a second interval, $x_2$, of the length dimension, x, adjacently arranged the first interval, $x_1$, wherein the second interval, $x_2$, comprises a function, F(x), of the luminance, $L_P$, with a second gradient, $G_2 = dL_P/dx$, and a third interval, $x_3$, of the length dimension, x, adjacently arranged one of the first interval, $x_1$, and the second interval, $x_2$, comprising a nominal level, $L_n(x)$, of the luminance, $L_P$, with a third gradient, $G_3 = dL_P/dx$, wherein one of sgn $(G_1) = -1$, sgn $(G_2) = +1$, and $|G_1| > G_2| > |G_3|$, and sgn $(G_1) = 1$, sgn $(G_2) = -1$, and $G > |G_2| > |G_3|$, is fulfilled.

Thus, the present invention is based on the idea of a luminaire which, via its light exit window, is able to provide a luminance with an edge pattern such that one or more parts of the light exit window may appear brighter, whereas one or more parts of the light exit window may appear darker. This effect is also known, or referred to, as a Craik-O'Brien-Cornsweet illusion (hereafter denoted Cornsweet illusion). By the features of the luminaire of the present invention, a reduced overall glare may be provided during operation of the luminaire. For example, such an edge pattern fulfilling the conditions given above, causes the Cornsweet illusion to occur when the profile of the luminance $L_P$ in the direction from its center of the light exit window to the periphery of the light exit window comprises a change in luminance, L, from a first luminance, $L_1$, via a step function S(x) in luminance comprising at least one of a maximum step luminance $L_{smax}$, and a minimum step luminance $L_{smin}$, to a second luminance, $L_2$, wherein both $L_1$, $L_2 > L_{smin}$ and $L_1$, $L_2 < L_{smax}$. Preferably $L_1 > L_2$, i.e. the center has a higher luminance than the periphery of the light exit window, which preferably is the case in outdoor lighting luminaires, such as luminaires for streetlighting. Thus the step function S(x) may comprise step change in luminance that comprises a maximum and/or a minimum in luminance. In the case the step function S(x) in luminance comprises the maximum step luminance $L_{smax}$, and the minimum step luminance $L_{smin}$, the profile of luminance L comprises a sequence of luminance $L_1$, $L_2$, $L_{smin}$, and $L_{smax}$ from center to periphery of the light exit window of either $L_1$-$L_{smin}$-$L_{smax}$-$L_2$ or $L_1$-$L_{smax}$-$L_{smin}$-$L_2$, wherein $L_{smax} > L_1$, $L_2 > L_{smin}$. Preferably, $1.4*L_{smin} > L_1$, $L_2 > 1.2*L_{smin}$ and $1.2*L_1$, $L_2 < L_{smax} < 1.4*L_1$, $L_2$. The luminance usually is expressed in cd/m². Furthermore, it is preferred that said step function S(x) has a profile width in a range of about 0.5° to about 10°, defined by the angular extent of the profile as seen by an observer from a given distance.

The present invention is advantageous in that the luminaire may inhibit glare whilst the luminous intensity of the luminaire light from the luminaire may be maintained. In other words, whereas prior art arrangements may need to reduce the luminous intensity in order to reduce glare, which may result in added cost in optical beam shaping components, reduced efficiency and/or a requirement of a higher number of luminaires to evenly illuminate the same area, the luminaire of the present invention achieves efficiency related to cost and/or illumination properties.

The present invention is further advantageous in that the luminaire provides a convenient arrangement for glare reduction purposes. For example, as prior art arrangements may need to increase the light-emitting area in order to try to avoid glare, this may result in added cost in material usage and/or transport of the luminaires. In contrast, the luminaire of the present invention provides convenience regarding size, cost and/or operation.

The luminaire of the present invention comprises at least one light source arranged to emit light source light. By "luminaire", it is here meant substantially any luminaire, lighting arrangement, lighting device, or the like. The light source(s) may be substantially any light source, such as one or more light-emitting diodes, LEDs. The luminaire comprises a light exit window, wherein the light source light is arranged to exit the luminaire through the light exit window as luminaire light. The light exit window is configured to influence or modify the luminance, L, of the light source light, for generating a profile of the luminance, $L_P$, of the luminaire light as a function of a length dimension, x, of the light exit window, defined from a center of the light exit window to a periphery of the light exit window, e.g. a radius of the light exit window in case of a circular light exit window. In other words, the light exit window is arranged or configured to influence or affect the light source light in order to generate a profile, distribution or function of the luminance, $L_P$, of the luminaire light as a function of the radius of the light exit window. Explained differently, the light exit window of the luminaire is configured to map the luminance, L, of the light source light to a (two-dimensional) luminance profile, $L_P$. The profile of the luminance, $L_P$, comprises, at least, a first interval, $x_1$, of the length dimension, x, comprising a step function, $S(x)$, of the luminance, $L_P$, with a first gradient, $G_1 = dL_P/dx$. By the term "step function, $S(x)$", it is here meant a function representing a (very) sharp increase or decrease as a function of the length dimension, x. Hence, the first gradient, $G_1 = dL_P/dx$, is relatively (or very) high (if positive) or relatively (or very) low (if negative). It should be noted that the (very) sharp increase/decrease may be invisible for an observer at a distance from the luminaire which is e.g. 2-6 m for indoor lighting and 10-30 m for street lighting. The profile of the luminance, $L_P$, further comprises a second interval, $x_2$, of the length dimension, x, adjacently arranged to the first interval, $x_1$, wherein the second interval, $x_2$, comprises a function, $F(x)$, of the luminance, $L_P$, with a second gradient, $G_2 = dL_P/dx$. By "adjacently arranged", it is here meant that the second interval, $x_2$, of the length dimension, x, may be arranged or provided immediately next to the first interval, $x_1$, or alternatively, be arranged or provided in a vicinity of the first interval, $x_1$. The profile of the luminance, $L_P$, further comprises a third interval, $x_3$, of the length dimension, x, adjacently arranged to one of the first interval, $x_1$, and the second interval, $x_2$, comprising a nominal level, $L_n(x)$, of the luminance, $L_P$, with a third gradient, $G_3 = dL_P/dx$. It will be appreciated that the nominal level, $L_n(x)$, of the luminance, $L_P$, is preferably constant, and the third gradient, $G_3 = dL_P/dx$ is accordingly (very) small, such as zero, or almost zero. By "adjacently arranged", it is here meant that the third interval, $x_3$, of the length dimension, x, may be arranged or provided immediately next to the first interval, $x_1$, or the second interval, $x_2$, or alternatively, be arranged or provided in a vicinity of the first interval, $x_1$, or the second interval, $x_2$. One of sgn $(G_1) = -1$, sgn $(G_2) = +1$, and $|G_1| > G_2 > |G_3|$, and sgn $(G_1) = +1$, sgn $(G_2) = -1$, and $G > |G_2| > |G_3|$, is fulfilled. By "sgn", it is here meant the mathematical operator "sign", which may be positive (+1) or negative (−1). Hence, either sgn $(G_1) = -1$, sgn $(G_2) = +1$, and $|G_1| > G_2 > |G_3|$ is fulfilled, or sgn $(G_1) = +1$, sgn $(G_2) = -1$, and $G > |G_2| > |G_3|$ is fulfilled. Studies have shown that a preferred profile of the luminance, $L_P$, is concave for the second interval, $x_2$, which implies a relatively steep gradient at the second interval, $x_2$, close to the first interval, $x_1$, and a (very) small, or almost zero gradient close to the third interval, $x_3$.

According to an embodiment of the present invention, the light exit window may comprise a pattern configured to influence or modify the luminance, L, of the light source light. By the term "pattern", it is here meant a pattern of the light exit window achieved and/or provided by substantially any suitable material (e.g. paint) and/or technique (e.g. etching). Hence, the pattern affects and/or influences the light source light from the light source(s) for achieving the influence of the luminance, L, of the light source light, and for generating the profile of the luminance, $L_P$ of the luminaire light. The present embodiment is advantageous in that the provision of a pattern of the light exit window is convenient concerning the influence of the light exit window of the luminance, L, on the light source light. The present embodiment is further advantageous in that the light exit window may be replaced by another light exit window comprising another pattern, for a customized operation of the luminaire.

According to an embodiment of the present invention, the pattern is defined by a distribution of variable light transmission of the light exit window along the length dimension, x, thereof. By the term "variable light transmission", it is here meant that the pattern is arranged or configured to provide at least a first light transmission at at least a first position or section of the light exit window along the length dimension, x, thereof, and to provide at least a second light transmission at at least a second position or section of the light exit window along the length dimension, x, thereof, wherein the first light transmission(s) differ(s) from the second light transmission(s). The present embodiment is advantageous in that the property of the variable light transmission of the pattern may contribute to an even more desired and/or customized profile of the luminance, $L_P$, of the luminaire light as generated by the luminaire.

According to an embodiment of the present invention, the pattern may be defined by a distribution of variable texture of the light exit window along the length dimension, x, thereof. By the term "texture", it is here meant the surface characteristics of the pattern. Furthermore, by the term "variable texture", it is here meant that the pattern has at least a first texture at a first position or section of the light exit window along the length dimension, x, thereof, and at least a second texture at at least a second position or section of the light exit window along the length dimension, x, thereof, wherein the first texture(s) differ(s) from the second texture(s). The present embodiment is advantageous in that the property of the variable texture of the pattern may contribute to an even more desired and/or customized profile of the luminance, $L_P$, of the luminaire light as generated by the luminaire.

According to an embodiment of the present invention, the pattern may be defined by at least one two portions, $P_i$, of the light exit window, having a respective reflectivity, $R_i$. Hence, the pattern may be defined by at least a first portion, $P_1$, of the light exit window, having a first reflectivity, $R_1$, and at least a second portion, $P_2$, of the light exit window; having a first reflectivity, $R_2$, wherein $R_1 \neq R_2$.

According to an embodiment of the present invention, the light exit window may comprise at least one of a cover element and a foil comprising the pattern. Hence, the light exit window may comprise a cover element and/or a foil which comprises the pattern configured to influence/modify the luminance, L, of the light source light. The present embodiment is advantageous in that the pattern may be conveniently arranged on the light exit widow. The present embodiment is further advantageous in that the pattern may be exchanged by the replacement of the cover element and/or foil with another pattern, leading to a more versatile luminaire concerning a customized operation of the luminaire.

According to an embodiment of the present invention, the function, F(x), comprises at least one of an exponential function, a sine function, a cosine function, and a linear function. Hence, the function, F(x), may comprise any combination of an exponential, sine/cosine and linear function. It will be appreciated that many alternative functions and/or combination of functions would be feasible. The present embodiment is advantageous in that the function, F(x), is monotonous (i.e. no change of sign of the gradient) and smooth, and wherein the function, F(x), preferably shows a sharp kink at the transition to the first interval, $x_1$, and a smooth transition to the third interval, $x_3$.

According to an embodiment of the present invention, the light exit window may comprise an optical element configured to influence/modify the luminance, L, of the light source light and/or luminaire light via beam shaping of the said light. By the term "optical element", it is here meant substantially any element arranged or configured to affect and/or influence the luminance, L, of the light source light and/or luminaire light via beam shaping of said light.

According to an embodiment of the present invention, wherein, associated with a direction, DR, of the length dimension, x, of the light exit window, defined from the center of the light exit window to the periphery of the light exit window, sgn $(G_1)=-1$, sgn $(G_2)=+1$, and $|G_1|>|G_2|>|G_3|$, is fulfilled, and wherein a first portion of the light exit window, defined around the center thereof, has at least one first radial dimension, Ra, comprising one of the second interval, $x_2$, and the third interval, $x_3$, on the one hand, and the third interval, $x_3$, on the other hand. It should be noted that the term "radial dimension" may encompass radius (for a circular light exit window) as well as one or more length dimension(s) from a center point to an edge in case of a light exit window which is not circular shaped, such as e.g. being rectangular or square. Hence, in the latter case, there may be a first radial dimension which may span from the center to one or more edges. Alternatively, there may be a (primary) first radial dimension and a (secondary) first radial dimension with a different length compared to the (primary) first radial dimension.

According to an embodiment of the present invention, the at least one first radial dimension, Ra, is defined by the first interval, $x_1$, whereby at least one of the first interval, $x_1$, and the periphery of the light exit window forms a closed loop. Hence, the first (center) portion boundary is fully defined by the first interval, $x_1$, and/or the periphery of the light exit window, forming a closed loop. The present embodiment is advantageous in that this leads to a relatively strong glare reduction, compared to a case of the first (center) portion is not fully defined either by the first interval, $x_1$, or a combination of the first interval, $x_1$, and the boundary of the light exit window, resulting in a less strong brightness illusion and, consequently, a less strong glare reduction.

According to an embodiment of the present invention, the first portion has a first area, $A_1$, wherein a first ratio, $R_1$, between the first area, $A_1$, and a total area, A, of the light exit window, $R_1=A_1/A$, fulfills $0.03<R_1<0.14$. The present embodiment is advantageous in that the bright area is much smaller than the darker area, and hence the overall brightness and thus the glare is reduced compared to a uniform luminance profile with the same average luminance.

According to an embodiment of the present invention, wherein, associated with a direction, DR, of the length dimension, x, of the light exit window, defined from the center of the light exit window to the periphery of the light exit window, sgn $(G_1)=+1$, sgn $(G_2)=-1$, and $G>|G_2|>|G_3|$, is fulfilled, and wherein a second portion of the light exit window; defined around the center thereof, has at least one second radial dimension, $R_b$, comprising one of the second interval, $x_2$, and the third interval, $x_3$, on the one hand, and the third interval, $x_3$, on the second hand. According to an example, the at least one second radial dimension, $R_b$, is defined by the first interval, $x_1$, whereby at least one of the first interval, $x_1$, and the periphery of the light exit window forms a closed loop.

According to an embodiment of the present invention, the second portion has a second area, $A_2$, wherein a second ratio, $R_2$, between the second area, $A_2$, and a total area, A, of the light exit window, $R_2=A_2/A$, fulfills $R_2>0.86$. The present embodiment is advantageous in that the darker area is significantly larger than the brighter area, leading to a reduction of the overall glare.

According to an embodiment of the present invention, the first interval, $x_1$, of the length dimension, x, comprises a change of the luminance, $L_P$, in a range of 10-100%. It has been found that the optimum luminance peak contrast at the edge is around 20-30% (per side, leading to 40-60% if the Cornsweet edge is double-sided, i.e. with the second interval, $x_2$, at both sides of the first interval, $x_1$. The profile of the luminance $L_P$ in the direction from its center of the light exit window to the periphery of the light exit window may comprise a change in luminance, L, from a first luminance, $L_1$, via a step function S(x) in luminance comprising at least one of a maximum step luminance $L_{smax}$, and a minimum step luminance $L_{smin}$, to a second luminance, $L_2$, wherein both $L_1$, $L_2>L_{smin}$ and $L_1$, $L_2<L_{smax}$. Furthermore, preferably $L_1>L_2$, i.e. the center of the light exit window has a higher luminance than the luminance at the periphery of the light exit window, which preferably is the case in outdoor lighting luminaires, such as luminaires for streetlighting. Thus the step function S(x) may comprise a step change in luminance that comprises a maximum and/or a minimum in luminance.

In the case that the step function S(x) in luminance comprises the maximum step luminance $L_{smax}$, and the minimum step luminance $L_{smin}$, the profile of luminance L comprises a sequence in luminance $L_1$, $L_2$, $L_{smin}$, and $L_{smax}$ from center to periphery of the light exit window of either $L_1$-$L_{smin}$-$L_{smax}$-$L_2$ or $L_1$-$L_{smax}$-$L_{smin}$-$L_2$, wherein $L_{smax}>L_1$, $L_2>L_{smin}$. Typically $1.4*L_{smin}>L_1$, $L_2>1.2*L_{smin}$ and $1.2*L_1$, $L_2<L_{smax}<1.4*L_1$, $L_2$. The luminances are expressed in $cd/m^2$.

According to an embodiment of the present invention, a sum, S, of the first interval, $x_1$, and the second interval, $x_2$, fulfills 1 cm$<$S$<$16 cm. Studies have shown that the optimum profile width of the luminance, $L_P$, is about 1° (defined by the angular extent of the profile as seen by an observer from a given distance). As a typical indoor lighting viewing distance is 3 m, the sum, S (width) of the first interval, $x_1$, and the second interval, $x_2$, of the light exit window 130 should be about tan($\alpha=1°$)*3 m=0.05 m, i.e. 5 cm. It should be noted that the length of the first interval, $x_1$, is much smaller than the length of the second interval, $x_2$, Furthermore, the optimum profile width of the luminance, $L_P$, of about 1° relates to one (single) side of the pattern, and in case of a double-sided pattern (with the second interval, $x_2$, at both sides of the first interval, $x_1$), it is accordingly double, i.e. of about 2°.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1A:
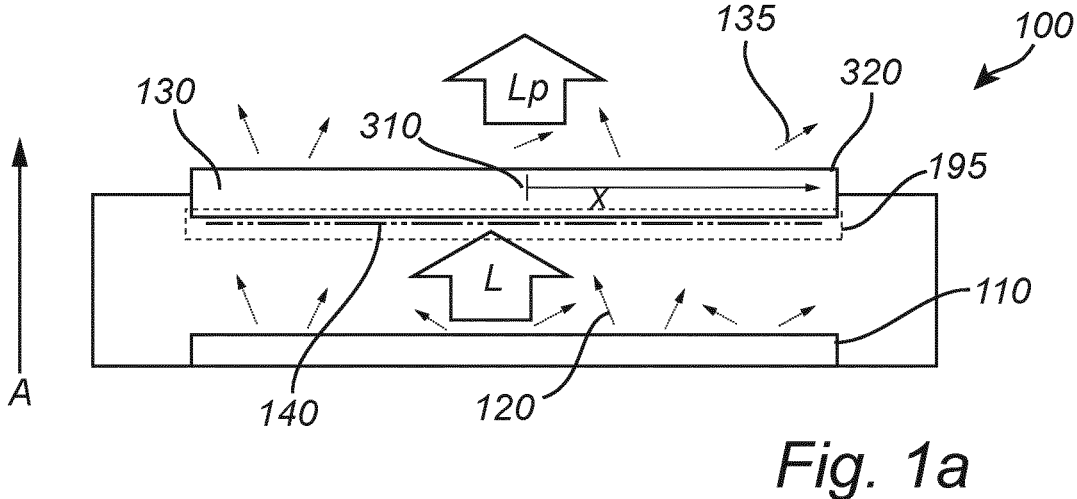
FIG. 1a schematically shows a luminaire according to an embodiment of the present invention, FIG. 1b schematically shows a profile of the luminance generated via the luminaire, FIG. 2 schematically shows a light exit window of a luminaire according to an embodiment of the present invention, FIGS. 3a-3f schematically show luminaires and profiles of the luminance and the brightness generated via luminaires according to embodiments of the present invention, FIGS. 4a-b schematically show luminaires according to embodiments of the present invention, and FIG. 5 schematically shows preferred lengths of the length dimension, x, of the light exit window of the luminaire according to an embodiment of the present invention.

FIG. 1a schematically shows a luminaire 100 according to an exemplifying embodiment of the present invention. It should be noted that the size, dimensions, etc. of the luminaire 100 and its components are not to scale. The luminaire 100 comprises at least one light source 110 arranged to emit light source light 120. The light source 110 may, for example, comprise one or more LEDs. The luminaire 100 further comprises a light exit window 130, arranged above the light source(s) 110 with respect to the axis, A. The emitted light source light 120 from the light source(s) 110 is arranged to exit the luminaire 100 through the light exit window 130 as luminaire light 135. It will be appreciated that the light exit window 130 may comprise substantially any material, or any composition of material, which is light-transmissive. The light exit window 130 is configured to influence/modify the luminance, L, of the emitted light source light 120, for generating a profile of the luminance, $L_P$, of the luminaire light 135 as described in FIG. 1b. For example, the light exit window 130 may comprise a pattern 140 configured to influence the emitted light source light 120 from the light source(s) 110 to create a luminance pattern of the luminance, $L_P$, of luminaire light 135 exiting the luminaire 100. The pattern 140 may be generated by printing or painting a layer of reflecting (preferred) or absorbing paint on the light exit window 130 of the luminaire 100. There may also be a pattern 140 in outcoupling features (paint dots, facets, chemically or laser etched patches, etc.) of a light guide, in case of an edge-lit luminaire panel (not shown). Other solutions involve a pattern 140 in thickness of the diffuser plate or foil, or a pattern in the shape of beam shaping elements (lenslets, micro-cones, micro-prisms) on a beam shaping optical plate. The pattern 140 is hereby created by local variations in beam shape, meaning that the contrast may reverse for different viewing directions: when the luminous intensity distributions vary locally, a higher luminous intensity in a given direction is typically compensated by a lower luminous intensity in another direction. The light exit window 130 may comprise a cover element and/or a foil 195 comprising the pattern 140, wherein the cover element/foil 195 is indicated by the dashed lines.

The profile of the luminance, $L_P$, is generated as a function of a length dimension, x, of the light exit window 130, defined from a center 310 of the light exit window 130 to a periphery 320 of the light exit window 130.

Figure 1B:
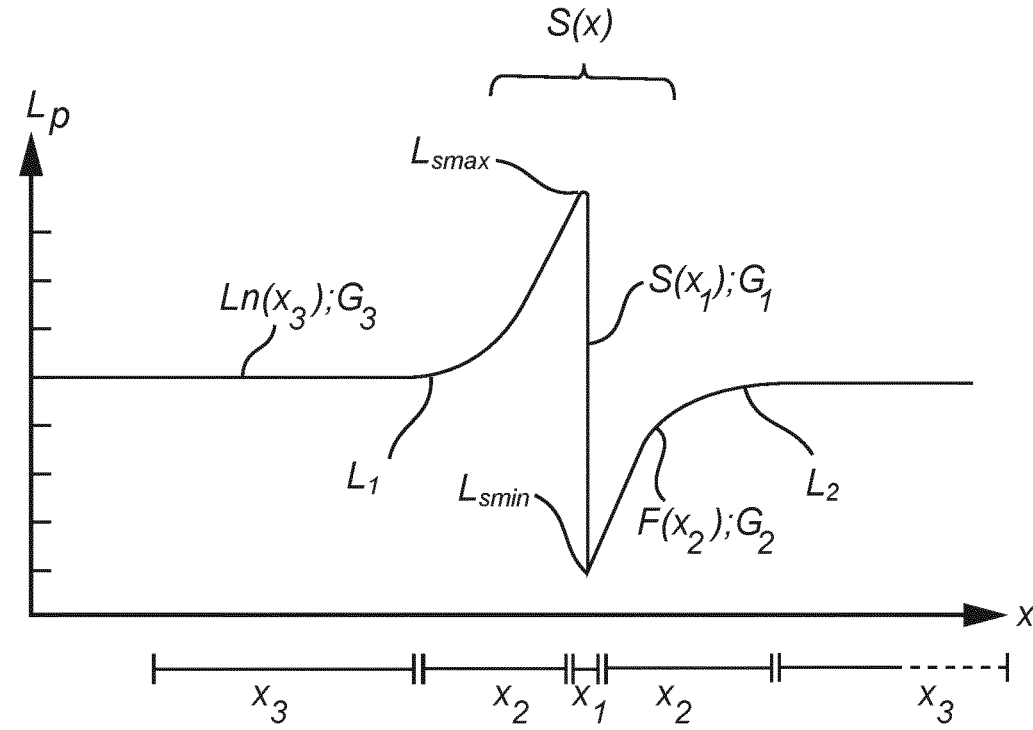

FIG. 1b schematically shows a profile of the luminance, $L_P$, having a step function S(x) in luminance with a maximum step luminance, $L_{smax}$ and a minimum step luminance, $L_{smin}$, in between a first luminance, $L_1$, at the center 310 of the light exit window 130 and a second luminance, $L_2$, at the periphery 320 of the light exit window 130, generated via the luminaire 100 and the light exit window 130 thereof, as described in FIG. 1a and the associated text. The profile of the luminance, $L_P$, comprises, at least, a first interval, $x_1$, of the length dimension, x, comprising a step function, S(x), of the luminance, $L_P$, with a first gradient, $G_1=dL_P/dx$. Hence, the change of luminance in the profile of the luminance, $L_P$, is significant at the first interval, $x_1$. The profile of the luminance, $L_P$, further comprises a second interval, $x_2$, of the length dimension, x, adjacently arranged the first interval, $x_1$, and indicated on either side of the first interval, $x_1$. The second interval, $x_2$, comprises a function, F(x), of the luminance, $L_P$, with a second gradient, $G_2=dL_P/dx$. The function, $F(x_2)$ may be substantially any function corresponding to the indicated profile, such as an exponential function, a sine/cosine function, a linear function, etc. Compared to the (significant), sharp change of luminance in the profile of the luminance, $L_P$, at the first interval, $x_1$, by the relatively high first gradient, $G_1=dL_P/dx$, the second gradient, $G_2=dL_P/dx$ of the luminance in the profile of the luminance, $L_P$, is lower at the second interval, $x_2$. The profile of the luminance, $L_P$, further comprises a third interval, $x_3$, of the length dimension, x, adjacently arranged the second interval, $x_2$, and indicated on either side of the second interval, $x_2$. The third interval, $x_3$, comprises a nominal level, $L_n(x)$, of the luminance, $L_P$, with a third gradient, $G_3=dL_P/dx$, being (very) small, such as (almost) zero. Compared to the changes of luminance in the profile of the luminance, $L_P$, by the first and second gradients at the first and second intervals, $x_1$, $x_2$, respectively, the nominal level, $L_n(x)$, represents a relatively small, or even non-existing, change of luminance in the profile of the luminance, $L_P$, by the third gradient. Hence, the luminance, $L_P$, is preferably constant in the third interval, $x_3$. It should be noted, however, that the change of luminance over the first interval, XI, and the change of luminance over the second intervals, $x_2$, is identical, as shown in FIG. 1b. The profile of the luminance, $L_P$, may be described mathematically, in that a first condition (sgn $(G_1)=-1$, sgn $(G_2)=+1$, and $|G_1|>G_2>|G_3|$) or a second condition (sgn $(G_1)=1$, sgn $(G_2)=-1$, and $G>|G_2|>|G_3|$) is fulfilled. Hence, in FIG. 1b, in a direction left to right, the first condition applies, as $G_1$ is negative (sgn $(G_1)=-1$), i.e. a decrease of the luminance in the profile of the luminance, $L_P$, and its absolute value is relatively high. $G_2$, on the other hand, is positive (sgn $(G_2)=+1$), i.e. an increase of the luminance in the profile of the luminance, $L_P$, with the relationship $|G_1|>G_2>|G_3|$. Alternatively, in a direction right to left, the second condition applies, wherein sgn $(G_1)=1$, sgn $(G_2)=-1$, and $G>|G_2|>|G_3|$ is fulfilled.

In other words, by the profile of the luminance, $L_P$, in FIG. 1b as generated by the luminaire 100 comprises a relatively sharp step, $S(x_1)$, whereas the second gradient, $G_2$, of the function, F(x), of the luminance, $L_P$, is not as sharp, which in turn, is sharper than the third gradient, $G_3$, of the nominal level, $L_n(x)$, of the luminance, $L_P$. The luminaire

100 hereby achieves, via the Cornsweet illusion, a reduced overall glare during operation of the luminaire 100.

Figure 2:
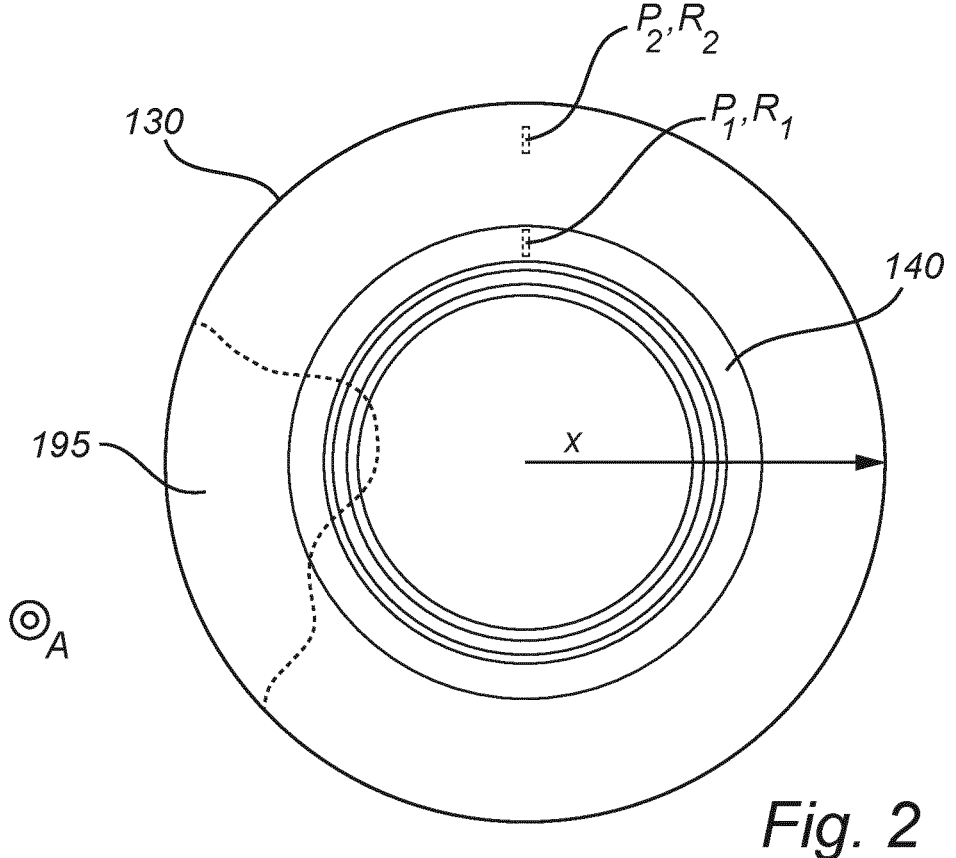

FIG. 2 schematically shows a light exit window 130 of a luminaire according to an embodiment of the present invention. Here, the light exit window 130 is exemplified as having a round shape, but it should be noted that other shapes (e.g. rectangular) are feasible as well. Compared to the orientation of the luminaire 100 in FIG. 1a, with respect to the axis, A, the light exit window 130 in FIG. 2 is shown from above as indicated by the axis, A. In FIG. 2, the light exit window 130 comprises a pattern 140 configured to influence/modify the luminance, L, of the light source light emitted from the light source(s) of the luminaire. Analogously with the schematically indicated pattern 140 of FIG. 1a, it should be noted that the form of the pattern 140 in FIG. 2 is (also) merely indicated for reasons of understanding, and that the pattern 140 may have many different forms in order to influence the luminance. L, of the light source light for achieving the profile of the luminance, $L_P$ of the luminaire light. The lines in the pattern 140 indicate features in the luminance pattern like maxima, minima, or transitions between intervals. Accordingly, the concentric circles of the pattern 140 in FIG. 2 are merely presented as examples, and the pattern 140 may take on many different forms and/or comprise many different features. The pattern 140 may, for example, be achieved by paint. According to one or more other examples, the pattern 140 may be defined by a distribution of variable light transmission of the light exit window 130 along the length dimension, x, thereof and/or be defined by a distribution of variable texture of the light exit window 130 along the length dimension, x, thereof. Furthermore, the pattern 140 may be defined by at least one two portions, $P_1$, $P_2$ of the light exit window 130, having a respective reflectivity, $R_1$, $R_2$, wherein $R_1/R_2$. It should be noted that the form, placement, etc., of the first and second portions, $P_1$, $P_2$, in FIG. 2 are merely exemplifying and for reasons of understanding, and may be different than those shown in FIG. 2. of the light exit window 130.

Analogously with FIG. 1a, the light exit window 130 may comprise a cover element and/or a foil 195 comprising the pattern 140. It should be noted that the cover element and/or a foil 195 in FIG. 2 is merely indicated for reasons of understanding that the cover element/foil 195 comprises the pattern 140. Furthermore, the light exit window 130 may comprise an optical element (not shown) configured to influence/modify the luminance, L and/or $L_P$, of the light source light and/or luminaire light via beam shaping of the light source light and/or luminaire light.

FIGS. 3a-3f schematically shows luminaires and profiles of the luminance and the brightness generated via luminaires according to embodiments of the present invention.

Figure 3A:
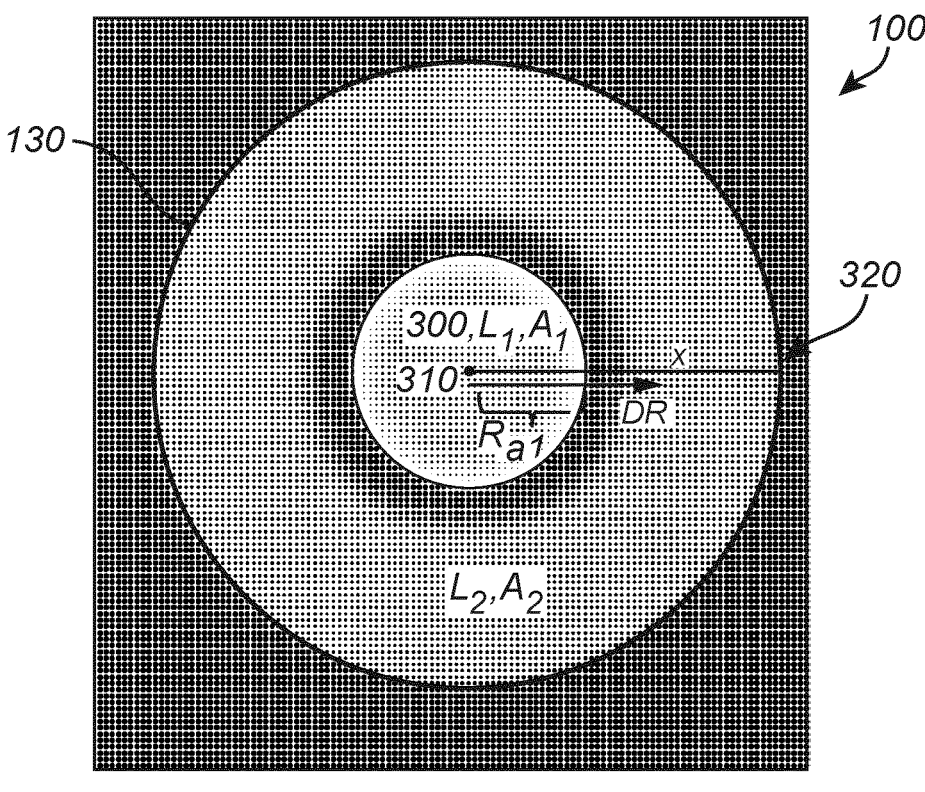
Figures 3B, 3C:
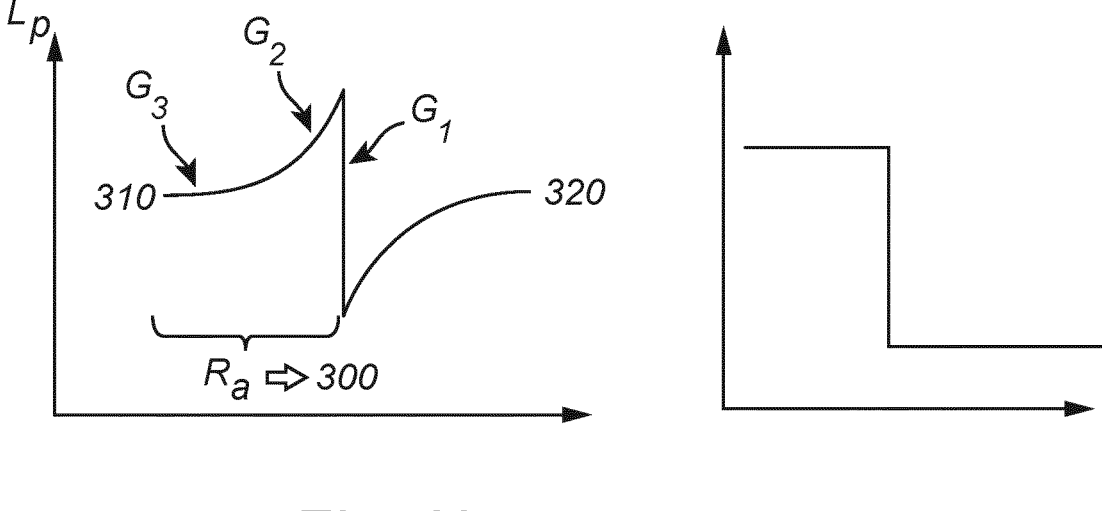
Figures 3D, 3E, 3F:
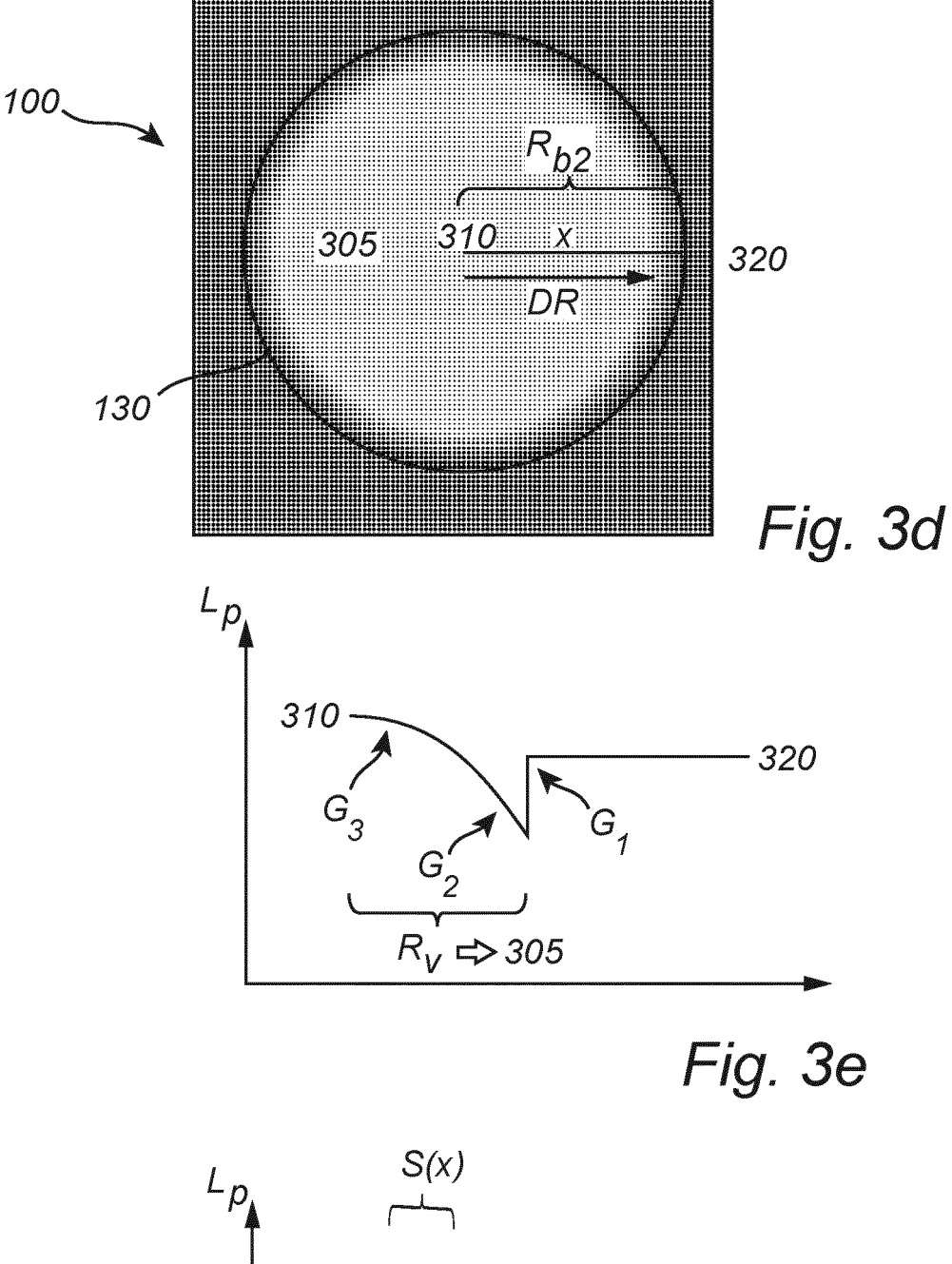

FIGS. 3a and 3b schematically show luminaires 100 according to embodiments of the present invention. The profile of the luminance, $L_P$, in FIG. 3b corresponds to the luminaire 100 shown in FIG. 3a. In turn, the profile of the luminance, $L_P$, in FIG. 3b corresponds to that shown in FIG. 1b (the intervals $x_1$, $x_2$, $x_3$, and the functions S(x), F(x), Ln(x), are omitted in FIG. 3b, and it is referred to FIG. 1b). In FIG. 3b, the profile of the luminance, $L_P$, comprises, at least, a first interval, $x_1$, of the length dimension, x, comprising a step function, S(x), of the luminance, $L_P$, with a first gradient, $G_1=dL_P/dx$. The profile of the luminance, $L_P$, further comprises a second interval, $x_2$, of the length dimension, x, adjacently arranged the first interval, $x_1$, wherein the second interval, $x_2$, comprises a function, F(x), of the luminance, $L_P$, with a second gradient, $G_2=dL_P/dx$. The profile of the luminance, $L_P$, further comprises a third interval, $x_3$, of the length dimension, x, adjacently arranged the second interval, $x_2$, comprising a nominal level, $L_n(x)$, of the luminance, $L_P$, with a third gradient, $G_3=dL_P/dx$. Associated with a direction, DR, of the length dimension, x, of the light exit window 130, defined from the center 310 of the light exit window 130 to the periphery 320 of the light exit window 130, as indicated in FIG. 3a, the condition (sgn $(G_1)=-1$, sgn $(G_2)=+1$, and $|G_1|>G_2>|G_3|)$ is fulfilled, as shown by the luminance, $L_P$, profile in FIG. 3b. The luminance, $L_P$, profile in FIG. 3b is known to lead to the visual illusion of a step in brightness, as schematically indicated by FIG. 3c (not to scale). As a result, the luminance profile will make the exit window appear as if one side has a higher "apparent" luminance and the opposite side has a lower "apparent" luminance, even though the actual luminance may be the same at both sides of the luminance profile. Furthermore, as shown in FIG. 3a, a first (central) portion 300 of the light exit window 130, defined around the center thereof, has a first radius, Ra (exemplified by Ra$_1$). The first portion 300 may comprise the second interval, $x_2$, and the third interval, $x_3$, as indicated by Ra$_1$ in FIG. 3a. Hence, the first radius, Ra$_1$, extends from the center of the light exit window 130 to the boundary as may be defined by the first interval, $x_1$. The first portion 300 may alternatively be bounded by the boundary of the light exit window 130. Alternatively, the first portion 300 comprises (only) the third interval, $x_3$, as indicated/defined by Raz for a single-sided Cornsweet edge pattern as shown in FIG. 3f. Hence, in FIG. 3f a step function S(x) in luminance with only a minimum step luminance, $L_{smin}$, in between a first luminance, L1, at the center of the light exit window and a second luminance, L2, at the periphery of the light exit window.

In FIG. 3a, the luminaire 100 is divided into two areas: center area, $A_1$, with "apparent" luminance L1=L+dL, and rim area, $A_2$, with "apparent" luminance L2=L−dL, wherein the relation between dL and L, as an example, may be dL=0.2·L. It should be noted that the relation between dL and L merely presents an example, and that relation may vary significantly from depending on the details of the profile (shape, amplitude, width, observer position, etc.).

The unified glare rating, UGR, is a measure of the glare in a given environment. More specifically, the UGR may be used to predict discomfort glare in interior applications, and in mathematical terms, the UGR is a function of the logarithm of the sum of all glare contributions of the visible light sources in the field of view, divided by the background luminance. The change in the UGR can be determined by adding up the contributions of the two areas, $A_1$, $A_2$, as if they are two separate sources, wherein A is the total area:

$$\delta UGR = 8\log_{10}\left(L_1^2 \cdot A_1 + L_2^2 \cdot A_2\right)/\left(L^2 \cdot A\right) = \qquad \text{(Eq. 1)}$$

$$8\log_{10}\left(1 + (dL/L)^2 + 2\cdot(dL/L)\cdot((A_1 - A_2)/A)\right)$$

The just noticeable difference in glare roughly corresponds with 1 UGR point. Taken as a lower limit ($\delta$UGR=−1, wherein the minus sign due to a desired reduction in glare), the relation between the bright center area, $A_1$, and the total area, A, is $A_1$=0.14A, which may correspond to a circle with 22 cm diameter in case of an exemplifying diameter of 60 cm of the light exit window. The bright area may even be a bit smaller to have even more glare reduction, but probably not smaller than 10 cm diameter for the example of a light exit window having a diameter of 60 cm, because the Cornsweet edge requires this minimum width.

Hence, as described mathematically, and according to the example of FIG. 3d, the first portion 300 has a first area, $A_1$, wherein a first ratio, $R_1$, between the first area, $A_1$, and a total area, A, of the light exit window, $R_1=A_1/A$, fulfills $0.03<R_1<0.14$. It should be noted, however, that the examples of the dimensions of the bright center area, A1, and/or the light exit window may be different for other luminaire (light exit window) sizes and/or different observer distances.

FIG. 3d comprises a different luminaire 100 compared to that of FIG. 3a, and the associated luminance, $L_P$, profile of FIG. 3d is different compared to that of FIG. 3b. Associated with a direction, DR, of the length dimension, x, of the light exit window, defined from the center 310 of the light exit window to the periphery 320 of the light exit window according to the luminaire 100 of FIG. 3a, the condition (sgn $(G_1)=+1$, sgn $(G_2)=$sgn $(G_3)=-1$, and $G>|G_2|>|G_3|$) is fulfilled by the profile of the luminance, $L_P$, of FIG. 3e (the intervals $x_1$, $x_2$, $x_3$, and the functions S(x), F(x), $L_n(x)$, are omitted in FIG. 3e, and it is referred to FIG. 1b). Furthermore, as shown in FIG. 3d, a second portion 305 of the light exit window 130, defined around the center thereof, has a second radius, Rb (exemplified as $Rb_2$). The second portion 305 may comprise the second interval, $x_2$, and the third interval, $x_3$, as indicated by $Rb_2$ in FIG. 3d. In FIG. 3d, the edge coincides with the edge of the light exit window 130, and the areas outside the light exit window 130 is the ceiling in which the luminaire 100 is placed. FIG. 3d describes the situation of a single-sided Cornsweet pattern, where the first interval, $x_1$, coincides with the boundary of the light exit window 130, with the (darker) second interval, $x_2$, on the inside and the third interval, $x_3$, at the center. This embodiment reduces the brightness of the second (center) portion 305. In this case, there is no third interval, $x_3$, outside the second portion 305, because the second portion 305 fills the full light exit window 130. The outside area (i.e. outside the light exit window 130) represents a (relatively) dark ceiling, and leads to the relatively dark (compared to the situation without Cornsweet edge) second portion 305 which still is brighter than the ceiling.

According to an example, it may be desired to have a central portion, $A_c$, (not shown) as large as possible to reduce glare. For example, a second ratio, $R_2$, between the second area, $A_c$, and a total area, A, of the light exit window; $R_2=A_c/A$, may fulfill $R_2>0.86$. This may correspond to a circle with 56 cm diameter for the example of a light exit window 130 having a diameter of 60 cm. It is noted that this only leaves a 2 cm edge for the bright area. As this is too small for a full Cornsweet pattern (preferably at least 5 cm is needed for the bright part of the Cornsweet edge), the contrast illusion is likely to be less strong.

Figure 4A:
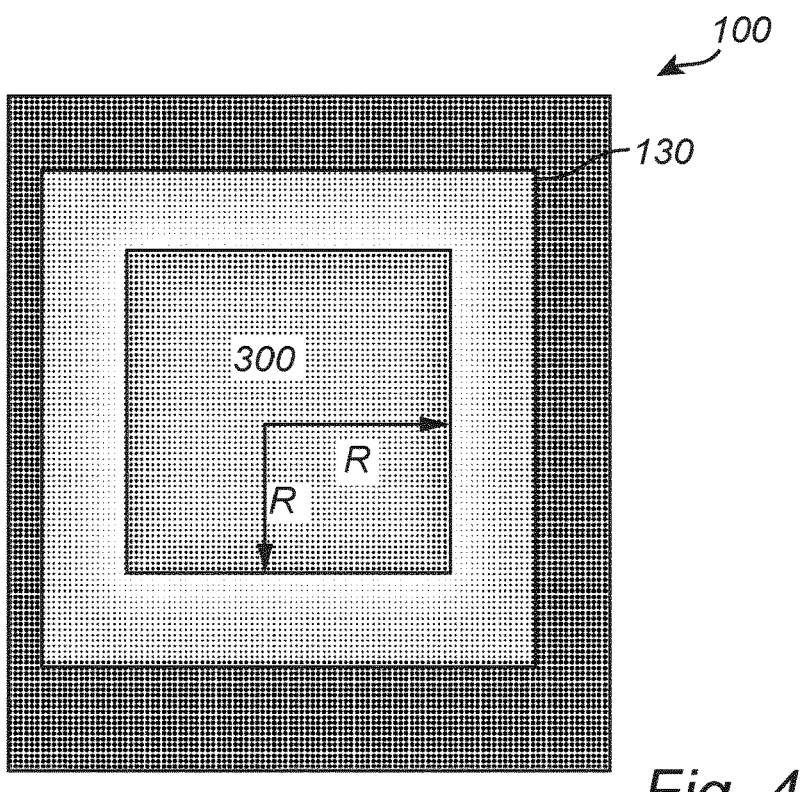
Figure 4B:
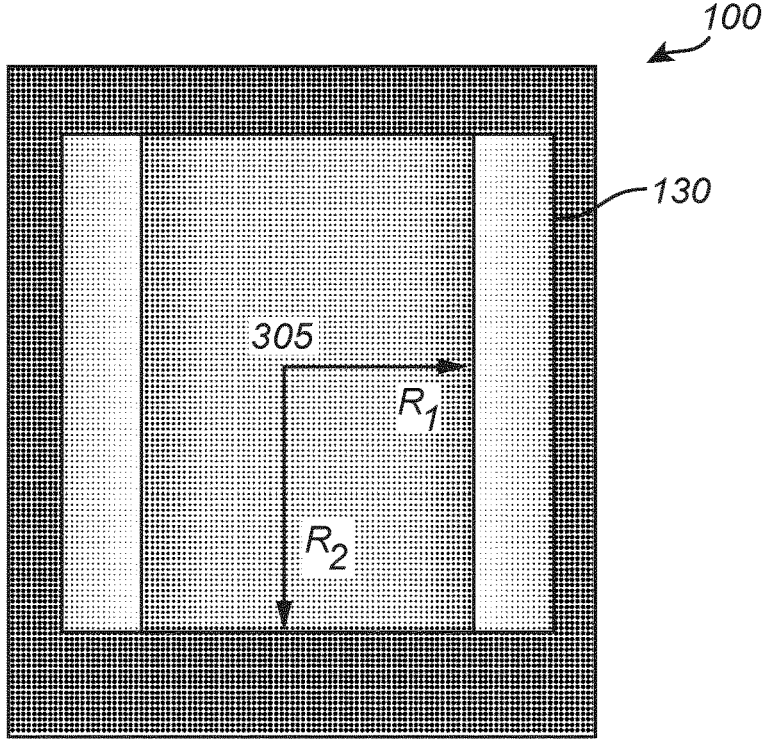

FIGS. 4a-b schematically show luminaires 100 according to embodiments of the present invention. Here, the light exit windows 130 are rectangular (e.g. square). In FIG. 4a, the center portion 300 of the light exit window 130 comprises the second interval, $x_2$, and the third interval, $x_3$, whereas the boundary of the center portion 300 is at the first interval, XI (the first, second and third intervals are not indicated in FIG. 4a-b, and it is referred to FIG. 1b). In FIG. 4a, the first interval, $x_1$, hereby forms a closed loop. The radial dimensions, R, in FIG. 4a, shown in a perpendicular relationship, have the same length. In contrast, the luminaire 100 according to FIG. 4b discloses a center portion 300 which boundary is at the first interval, $x_1$, and inside the light exit window 130, along a horizontal axis in FIG. 4b, and that the first interval, $x_1$, is at the edge of the light exit window 130, along a vertical axis in FIG. 4b. The radial dimensions, $R_1$, $R_2$, in FIG. 4a, shown in a perpendicular relationship, have different lengths. Hence, whereas the central portion 300 of the light exit window 130 in FIG. 4a has a boundary that is defined by the first interval, $x_1$, the central portion 305 is partly defined by the first interval, $x_1$, and partly defined by the boundary of the light exit window 130. In configurations where the center portion boundary is not fully defined by either the first interval, $x_1$, or a combination of the first interval, $x_1$, and the boundary of the light exit window 130, the brightness illusion created by the luminance pattern and hence the glare reduction is less strong. This unwanted situation may occur when the first interval, $x_1$, does not form a closed loop and ends somewhere inside the light exit window 130.

Figure 5:
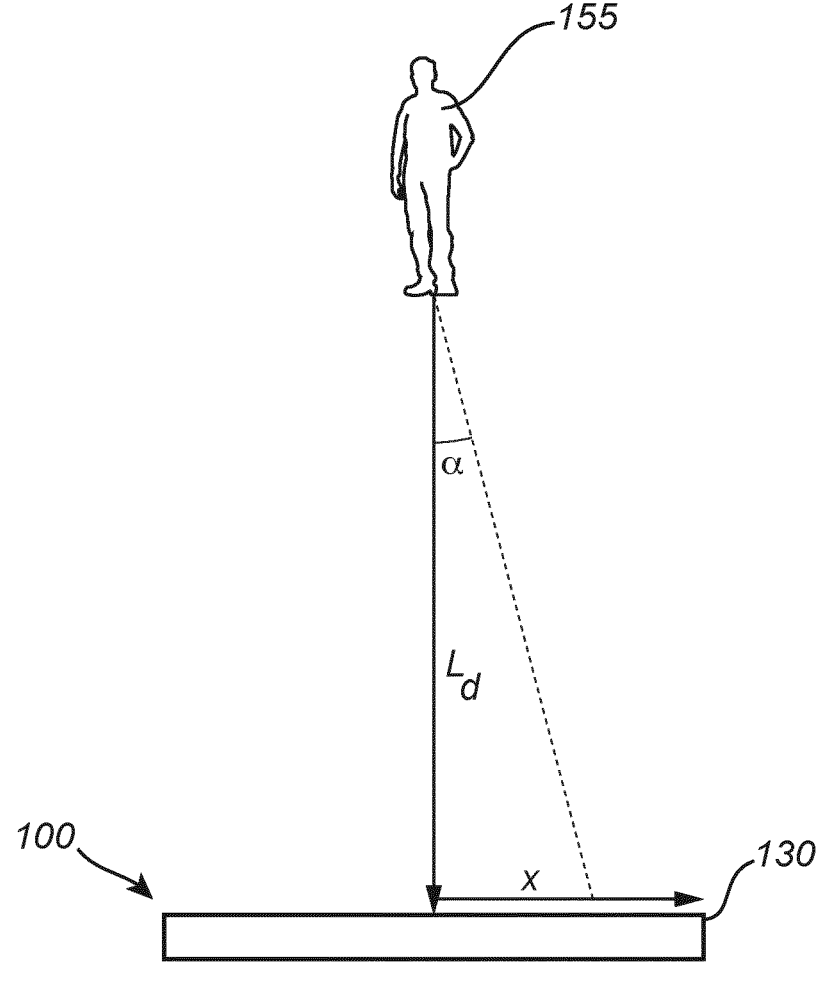

FIG. 5 schematically shows preferred lengths of the length dimension, x, of the light exit window 130 of the luminaire 100. Studies have shown that the optimum profile width of the luminance, $L_P$, is about 1 degree, corresponding to the optimum width of the second interval, $x_2$, as the width of the first interval, $x_1$, may be negligible. As a typical indoor lighting viewing distance, $L_d$, i.e. the distance from the light exit window 130/luminaire 100 to a user 155 is 3 m, the sum, S (width) of the first interval, $x_1$, and the second interval, $x_2$, of the light exit window 130 should be about $\tan(\alpha=1°)*3$ m=0.05 m. The width should preferably be larger than $\alpha=0.5°$ (corresponding to 0.025 m) and preferably not below $\alpha=0.2°$ (corresponding to 0.01 m). On the other hand, a larger width than $\alpha=1°$ will enhance the effect, but the increase becomes marginal above $\alpha=2-3°$. Hence, the width is preferably less wide than $\alpha=3°$ (corresponding to 0.16 m), as in practice, widths larger than $3°$ usually do not fit within most indoor lighting luminaires (for example, in indoor lighting, a standard luminaire size is often about 0.6 m×0.6 m. It should be noted that a ceiling grid spacing may be 60 cm, which results in slightly smaller luminaires, such as 0.58 cm×0.58 cm. Larger luminaires may also be used, or alternatively, very slim luminaires such as 10 cm×120 cm.

The person skilled in the art realizes that the present invention by no means is limited to the preferred embodiments described above. On the contrary, many modifications and variations are possible within the scope of the appended claims. For example, the size(s) and/or form(s) of one or more components of the luminaire 100 (e.g. the light source(s) 110, the light exit window 130, etc.), the forms/profiles of the luminance, $L_P$, may be different than those shown, etc.

The invention claimed is:

1. A luminaire, comprising
at least one light source arranged to emit light source light,
a light exit window, wherein the emitted light source light is arranged to exit the luminaire through the light exit window as luminaire light,
wherein the light exit window is configured to influence or modify the luminance, L, of the light source light, for generating a profile of the luminance, $L_P$, of the luminaire light as a function of a length dimension, x, of the light exit window, defined from a center of the light exit window to a periphery of the light exit window, wherein the profile of the luminance, $L_P$, at least comprises
a first interval, $x_1$, of the length dimension, x, comprising a step function, S(x), of the luminance, $L_P$, with a first gradient, $G_1=dL_P/dx$,
a second interval, $x_2$, of the length dimension, x, adjacently arranged the first interval, $x_1$, wherein the second interval, $x_2$, comprises a function, F(x), of the luminance, $L_P$, with a second gradient, $G_2=dL_P/dx$, and

13 a third interval, $x_3$, of the length dimension, x, adjacently arranged one of the first interval, $x_1$, and the second interval, $x_2$, comprising a nominal level, $L_n(x)$, of the luminance, $L_P$, with a third gradient, $G_3=dL_P/dx$, wherein one of $$\text{sgn}(G_1) = -1, \text{sgn}(G_2) = +1, \text{and } |G_1| > G_2 > |G_3|,$$

and $$\text{sgn}(G_1) = +1, \text{sgn}(G_2) = -1, \text{and } G_1 > |G_2| > |G_3|,$$

is fulfilled,
and wherein the profile of the luminance $L_P$ in the direction from its center of the light exit window to the periphery of the light exit window comprises a change in luminance, L, from a first luminance, $L_1$, via the step function, S(x), in luminance comprising at least one of a maximum step luminance $L_{smax}$, and a minimum step luminance $L_{smin}$, to a second luminance, $L_2$, wherein $L_1$, $L_2>L_{smin}$ and $L_1$, $L_2<L_{smax}$.

2. The luminaire according to claim 1, wherein the step function, S(x), in luminance comprises the maximum step luminance $L_{smax}$, and the minimum step luminance $L_{smin}$, and the profile of luminance L comprises a sequence in luminance $L_1$, $L_2$, $L_{smin}$, and $L_{smax}$ from center to periphery of the light exit window of either $L_1–L_{smin}–L_{smax}–L_2$ or $L_1–L_{smax}–L_{smin}–L_2$, wherein $L_{smax}>L_1$, $L_2>L_{smin}$.

3. The luminaire according to claim 1, wherein the light exit window comprises a pattern configured to influence or modify the luminance, L, of the light source light into luminaire light.

4. The luminaire according to claim 3, wherein the pattern is defined by a distribution of variable light transmission of the light exit window along the length dimension, x, thereof.

5. The luminaire according to claim 3, wherein the pattern is defined by a distribution of variable texture of the light exit window along the length dimension, x, thereof.

6. The luminaire according to claim 3, wherein the pattern is defined by at least two portions, $P_i$, of the light exit window, having a respective reflectivity, $R_i$.

7. The luminaire according to claim 3, wherein the light exit window comprises at least one of a cover element and a foil comprising the pattern.

8. The luminaire according to claim 1, wherein the light exit window comprises an optical element configured to influence or modify the luminance, L and/or $L_P$, of the light source light and/or luminaire light via beam shaping of said light.

9. The luminaire according to claim 1, wherein, associated with a direction, DR, of the length dimension, x, of the light exit window, defined from the center of the light exit window to the periphery of the light exit window, $$\text{sgn}(G_1) = -1, \text{sgn}(G_2) = +1, \text{and } |G_1| > G_2 > |G_3|,$$

is fulfilled,
and wherein a first portion of the light exit window, defined around the center thereof, has at least one first radial dimension, Ra, comprising one of
the second interval, $x_2$, and the third interval, $x_3$,
and
the third interval, $x_3$.

10. The luminaire according to claim 9, wherein the at least one first radial dimension, Ra, is defined by the first interval, $x_1$, whereby at least one of the first interval, $x_1$, and the periphery of the light exit window forms a closed loop.

11. The luminaire according to claim 9, wherein the first portion has a first area, $A_1$, wherein a first ratio, $R_1$, between the first area, $A_1$, and a total area, A, of the light exit window, $R_1=A_1/A$, fulfills $0.03<R_1<0.14$.

12. The luminaire according to claim 1, wherein, associated with a direction, DR, of the length dimension, x, of the light exit window, defined from the center of the light exit window to the periphery of the light exit window, $$\text{sgn}(G_1) = +1, \text{sgn}(G_2) = -1, \text{and } G_1 > |G_2| > |G_3|,$$

is fulfilled,
and wherein a second portion of the light exit window, defined around the center thereof, has at least one second radial dimension, $R_b$, comprising one of
the second interval, $x_2$, and the third interval, $x_3$,
and
the third interval, $x_3$.

13. The luminaire according to claim 12, wherein the second portion has a second area, $A_c$, wherein a second ratio, $R_2$, between the second area, $A_c$, and a total area, A, of the light exit window, $R_2=A_c/A$, fulfills $R_2>0.86$.

14. The luminaire according to claim 1, wherein the first interval, $x_1$, of the length dimension, x, comprises a change of the luminance, $L_P$, in a range of 10-100%.

15. The luminaire according to claim 1, wherein a sum, S, of the first interval, $x_1$, and the second interval, $x_2$, fulfills 1 cm$<$S$<$16 cm.

* * * * *